United States Patent [19]

Bryan et al.

[11] Patent Number: 5,593,578
[45] Date of Patent: *Jan. 14, 1997

[54] FILTER ADAPTER AND DISPOSABLE FILTER

[75] Inventors: George H. Bryan, Concord; Mihai G. M. Pop, Lynchburg, both of Va.

[73] Assignee: B & W Nuclear Technologies, Lynchburg, Va.

[ * ] Notice: The portion of the term of this patent subsequent to Aug. 8, 2014, has been disclaimed.

[21] Appl. No.: 339,947

[22] Filed: Nov. 15, 1994

[51] Int. Cl.⁶ ................................................ B01D 27/50
[52] U.S. Cl. ...................... 210/232; 210/237; 210/356; 210/450; 210/497.01; 376/260; 376/313
[58] Field of Search ................................. 210/232, 237, 210/238, 435, 451, 452, 541, 767, 791, 497.01, 282, 356, 448, 450, 455; 376/260, 313

[56] References Cited

U.S. PATENT DOCUMENTS

| | | | |
|---|---|---|---|
| 3,890,233 | 6/1975 | Gishel | 210/237 |
| 4,572,710 | 2/1986 | Stock et al. | 210/237 |
| 4,738,777 | 4/1988 | Parshall | 210/455 |
| 4,756,876 | 7/1988 | Dagard et al. | 376/313 |
| 4,818,398 | 4/1989 | Lott et al. | 210/238 |
| 4,883,588 | 11/1989 | Primavera et al. | 376/313 |
| 5,017,330 | 5/1991 | Hurdiel | 210/237 |
| 5,379,330 | 1/1995 | Lovell et al. | 210/237 |
| 5,476,585 | 12/1995 | Mills | 210/232 |
| 5,478,469 | 12/1995 | Bryan et al. | 210/450 |

Primary Examiner—Joseph W. Drodge
Attorney, Agent, or Firm—Rhodes Coats & Bennett, L.L.P.

[57] ABSTRACT

A filter adapter and filter cartridge for a filter assembly for removing particulate matter from an aqueous flow by means of a filter vessel having a support housing, a removable top, an input port for the aqueous flow, an exit port for the aqueous flow and an internal seal. The filter assembly includes a filter adapter configured similarly to the housing and sized to be substantially entirely received within the housing and sealingly engage the internal seal of the housing. A filter cartridge is configured similarly to the filter adapter and is sized to be substantially entirely received within the filter adapter and to simultaneously engage the filter vessel top and sealingly engage the filter adapter outlet. A biasing spring is located between the filter cartridge and the filter adapter. Securing the filter vessel top to the filter vessel housing causes the filter cartridge to simultaneously compress the biasing spring in the filter adapter, form a seal with the filter adapter outlet, and form a seal between the filter adapter and the internal seal of the filter vessel housing, whereby the filter adapter may be installed in the filter vessel for an extended period and repeatedly during the extended period, the filter cartridge may be installed within the filter adapter to seal the cartridge to the filter adapter and the filter adapter to the filter vessel, aqueous flow may be directed through the filter medium, and the cartridge may be removed and discarded.

31 Claims, 2 Drawing Sheets

FILTER ADAPTER AND DISPOSABLE FILTER

BACKGROUND OF THE INVENTION (1) Field of the Invention

The present invention relates generally to filters and, more particularly, to a filter adapter for a filter vessel utilizing a disposable filter for removing particulate matter from an aqueous flow, especially radioactive materials entrained in cooling water, which reduces exposure to radioactive materials and the volume and weight of the hazardous waste resulting from the end of life of the filter.

(2) Description of the Prior Art

Nuclear reactors use circulating water as a coolant for the radioactive core. Some of the particles picked up by the cooling water are radioactive. Before the water can be recirculated in the cooling loop, the radioactive materials must be removed. This is done conventionally by filter elements that are installed for a given period of time to remove the waste particles. After a period of time, the filter becomes clogged with removed particles and must be replaced.

Conventional filters for this purpose have a perforated, cylindrical stainless steel outer hull or, in some cases, an inner core, and a permanently installed interior filter medium. The filtrate flows through the filter medium and the pores of the stainless steel core.

In addition, many U.S. nuclear plants and some plants in Europe use "Cuno" or similar filter vessels originally designed for non-nuclear applications which normally use baskets or clusters of small filter cartridges rather than a large filter cartridge which may be required to deal with the high flow rates required by a particular application. These baskets of filter cartridges are difficult to handle within a nuclear environment because the disposal of the spent cartridges requires manual human contact. This contact, of course, may result in additional exposure to radiation from the accumulated radioactive waste in most nuclear plant applications.

In an effort to avoid this handling problem, certain adapters have been developed to permit the use of single large filter cartridge in lieu of the numerous small filter cartridges that the Cuno system was designed to use. All of these adapters, such as the Cuno monocartridge adapter and the Pall Will-Fit™ adapter, have springs on top of the cartridge and adapter assembly to preload the filter basket to form a seal with the walls of the filter vessel as was used in the original design. The disadvantage of this approach is that because the filter cartridge also must be sealed at its bottom, the cartridge must be sealed in the adapter. Therefore, the filter adapter becomes an expended piece of hardware which must be replaced each time the filter is replaced. Efforts to reuse such adapters have failed because such efforts require as much handling to remove the spent filter cartridges from the adapter as was the case in the original Cuno basket filters.

Thus, there remains a need for a new and improved disposable filter and filter adapter which performs well in existing filter vessels while, at the same time, reduces exposure to radioactive materials and the volume and weight of the hazardous waste resulting from the end of life of the filter.

SUMMARY OF THE INVENTION

The present invention is directed to a filter adapter and filter cartridge for a filter assembly for removing particulate matter from an aqueous flow by means of a filter vessel having a support housing, a removable top, an input port for the aqueous flow, an exit port for the aqueous flow and an internal seal. The filter assembly includes a filter adapter configured similarly to the housing and sized to be substantially entirely received within the housing and sealingly engage the internal seal of the housing. The filter adapter has an annular bottom plate defining an adapter outlet. A filter cartridge is configured similarly to the filter adapter and is sized to be substantially entirely received within the filter adapter and to simultaneously engage the filter vessel top and sealingly engage the filter adapter outlet.

The filter cartridge includes a filter medium that extends across a path from the input port to the exit port when received in the housing. The filter cartridge includes a rigid, porous, sleeve having first and second ends, the first end having a closed end. A flexible filtering medium is affixed to the sleeve. A first seal on the first end of the sleeve is located between the first end and the filtering media. A second seal on the second end of the sleeve is located between the second end and the filtering media. A biasing means is located between the filter cartridge and the filter adapter.

Securing the filter vessel top to the filter vessel housing causes the filter cartridge to simultaneously compress the biasing means in the filter adapter, form a seal with the filter adapter outlet, and form a seal between the filter adapter and the internal seal of the filter vessel housing, whereby the filter adapter may be installed in the filter vessel for an extended period and repeatedly during the extended period, the filter cartridge may be installed within the filter adapter to seal the cartridge to the filter adapter and the filter adapter to the filter vessel, aqueous flow may be directed through the filter medium, and the cartridge may be removed and discarded.

Accordingly, one aspect of the present invention is to provide a filter for removing particulate matter from an aqueous flow by means of a filter vessel having a support housing, a removable top, an input port for the aqueous flow, an exit port for the aqueous flow and an internal seal. The filter assembly includes: (a) a filter adapter configured similarly to the housing and sized to be substantially entirely received within the housing and sealingly engage the internal seal of the housing, the filter adapter having an annular bottom plate defining an adapter outlet; and (b) a filter cartridge configured similarly to the filter adapter and sized to be substantially entirely received within the filter adapter and to simultaneously engage the filter vessel top and sealingly engage the filter adapter outlet and having a filter medium that extends across a path from the input port to the exit port when received in the housing, whereby the filter adapter may be installed in the filter vessel for an extended period and repeatedly during the extended period, the filter cartridge may be installed within the filter adapter to seal the cartridge to the filter adapter and the filter adapter to the filter vessel, aqueous flow may be directed through the filter medium, and the cartridge may be removed and discarded.

Another aspect of the present invention is to provide a filter cartridge for removing particulate matter from an aqueous flow and for installation inside a filter vessel having a support housing, a removable top, an input port for the aqueous flow, an exit port for the aqueous flow and an internal seal and a filter adapter configured similarly to the housing and sized to be substantially entirely received within the housing and sealingly engage the internal seal of the housing, the filter adapter having an annular bottom plate defining an adapter outlet. The filter cartridge includes: (a) a rigid, porous, sleeve having first and second ends, the first end having a closed end; (b) a flexible filtering medium affixed to the sleeve; (c) a first seal on the first end of the sleeve between the first end and the filtering media; and (d) a second seal on the second end of the sleeve between the second end and the filtering media, the sleeve and filtering medium configured similarly to the filter adapter and sized to be substantially entirely received within the filter adapter and to sealingly engage the filter adapter with the second seal and the filter medium extends across a path from the input ports to the exit ports of the housing, whereby the filter adapter may be installed in the filter vessel for an extended period and repeatedly during the extended period, the filter cartridge may be installed within the filter adapter to seal the filter cartridge to the filter adapter and the filter adapter to the filter vessel, aqueous flow may be directed through the filter medium, and the cartridge may be removed and discarded.

Still another aspect of the present invention is to provide a filter assembly for removing particulate matter from an aqueous flow by means of a filter vessel having a support housing, a removable top, an input port for the aqueous flow, an exit port for the aqueous flow and an internal seal. The filter assembly includes: (a) a filter adapter configured similarly to the housing and sized to be substantially entirely received within the housing and sealingly engage the internal seal of the housing, the filter adapter having an annular bottom plate defining an adapter outlet; (b) a filter cartridge configured similarly to the filter adapter and sized to be substantially entirely received within the filter adapter and to simultaneously engage the filter vessel top and sealingly engage the filter adapter outlet and having a filter medium that extends across a path from the input port to the exit port when received in the housing. The filter cartridge includes: (i) a rigid, porous, sleeve having first and second ends, the first end having a closed end; (ii) a flexible filtering medium affixed to the sleeve; (iii) a first seal on the first end of the sleeve between the first end and the filtering media; and (iv) a second seal on the second end of the sleeve between the second end and the filtering media. A biasing means is located between the filter cartridge and the filter adapter whereby securing the filter vessel top to the filter vessel housing causes the filter cartridge to simultaneously compress the biasing means in the filter adapter, form a seal with the filter adapter outlet, and form a seal between the filter adapter and the internal seal of the filter vessel housing, whereby the filter adapter may be installed in the filter vessel for an extended period and repeatedly during the extended period, the filter cartridge may be installed within the filter adapter to seal the cartridge to the filter adapter and the filter adapter to the filter vessel, aqueous flow may be directed through the filter medium, and the cartridge may be removed and discarded.

These and other aspects of the present invention will become apparent to those skilled in the art after a reading of the following description of the preferred embodiment when considered with the drawings.

DESCRIPTION OF THE PREFERRED EMBODIMENTS

Figure 2:
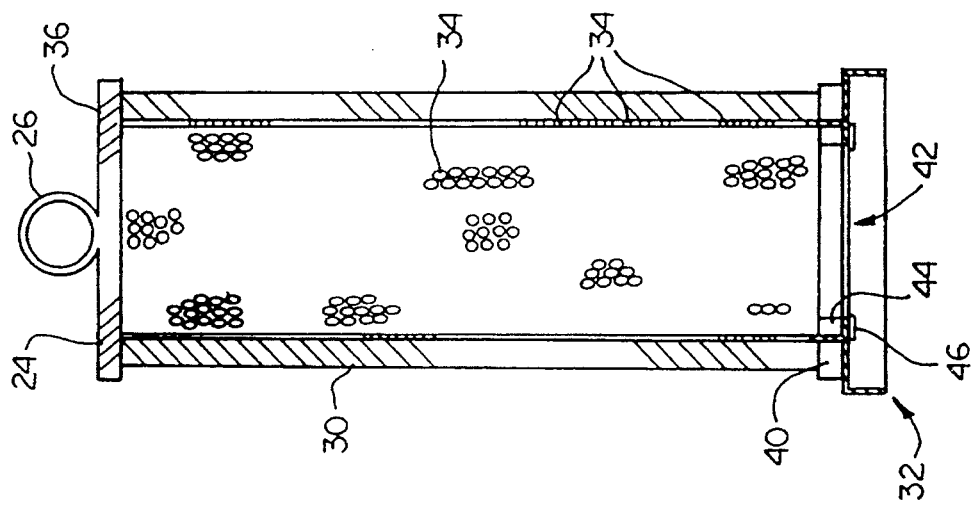
FIG. 2 is a cross-sectional view of the filter cartridge shown in FIG. 1.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
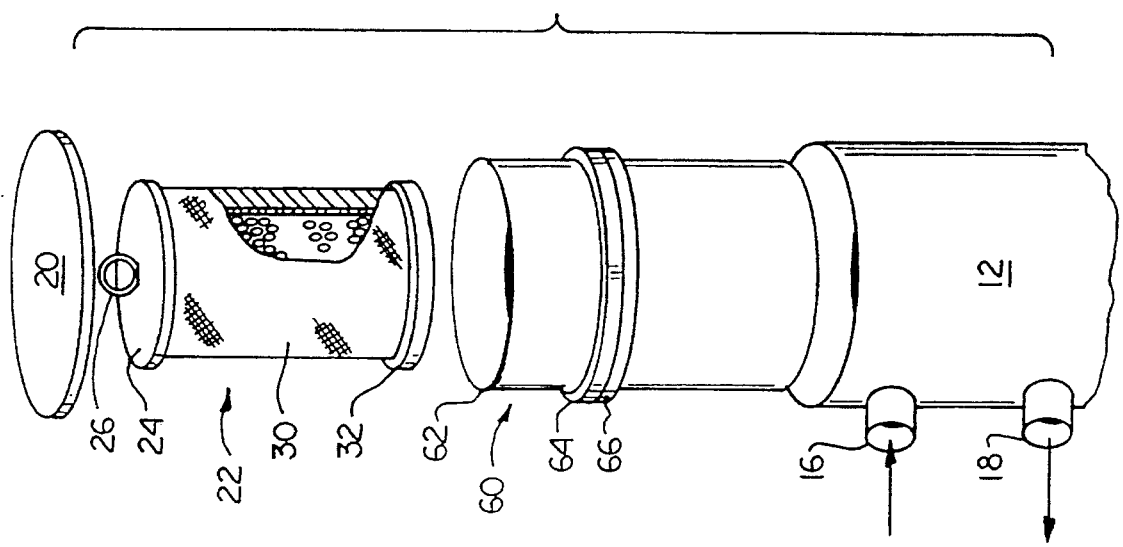
FIG. 1 is an exploded perspective view of a filter system constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a filter system, generally designated 10, is shown constructed according to the present invention. The filter system includes a conventional filter vessel 12 such as a Cuno filter vessel. Filter vessel 12 includes a tubular outer wall 14, an inlet 16, an outlet 18, and a sealable vessel top 20.

A disposable filter cartridge, constructed according to the present invention, is generally designated 22. Cartridge 22 includes a cartridge top 24, a lifting ring 26 attached to the top, a generally elongated tubular filter media 30, and a cartridge bottom 32. Further details of the cartridge will be shown in FIGS. 2 and 4.

A filter adapter, constructed according to the present invention, is generally designated 60. Adapter 60 includes a tubular outer wall 62, a support ring 64 attached about the outer periphery of the tubular wall 62, and a replaceable gasket 66. Further details of the filter adapter 60 will be shown in FIGS. 3 and 4.

As best seen in FIG. 2, there is shown a cross-sectional view of the disposable filter cartridge 22. Filter cartridge 22 includes a cartridge top 24 having a lifting ring 26 attached thereto and a bottom plate 32. A perforated tubular inner support 34 extends between and is attached to top 24 and bottom 32. A polymeric material, such as silicone rubber, forms a seal between filter media 30 and cartridge top 24. Similarly, a polymeric material also forms a seal between the other end of the perforated tubular inner support 34 and cartridge bottom 32. Cartridge bottom 32 has an annular configuration which forms outlet 42. An outlet seal 44 may be formed as a portion of lower seal 40. In the preferred embodiment, a load ring 46 is attached to the lower plate of cartridge bottom 32 opposite outlet seal 44 for the strength and the support structure.

Figure 3:
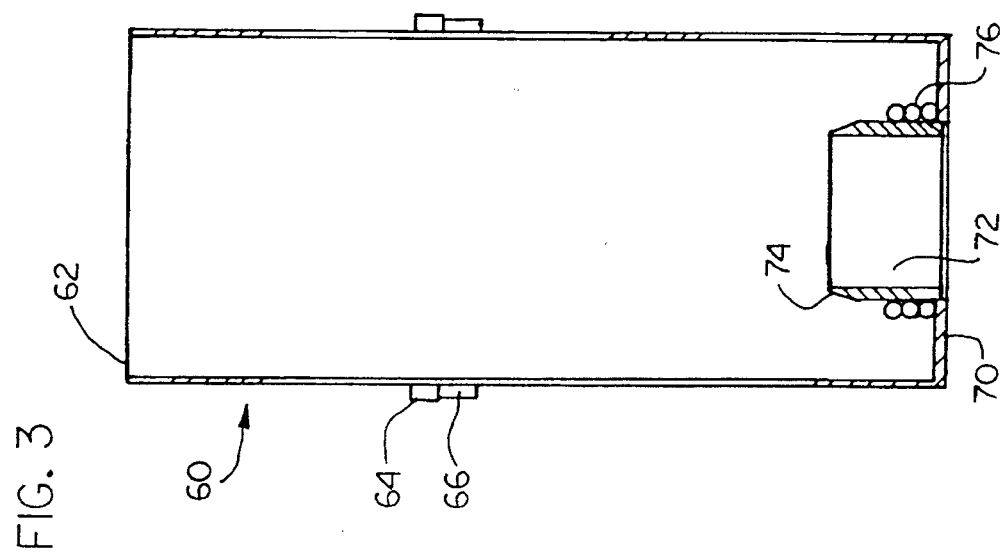
FIG. 3 is a cross-sectional view of the filter adapter shown in FIG. 1.

Turning now to FIG. 3, there is shown a cross-sectional view of filter adapter 60. Adapter 60 includes tubular outer wall 62 having a support ring 64 attached thereto. Filter 60 includes an annular bottom plate 70 having an inverted nozzle 72. Inverted nozzle 72 is formed into a tapered nose 74 whose function will better be understood later. In the preferred embodiment, a biasing means, such as a coil spring 76, is attached at one end to the upper plate of angular bottom plate 70. However, as will be understood later, the spring 76 could also be attached to the lower plate of the filter cartridge 22 or could be unattached to either the filter cartridge 22 or adapter 60.

Figure 4:
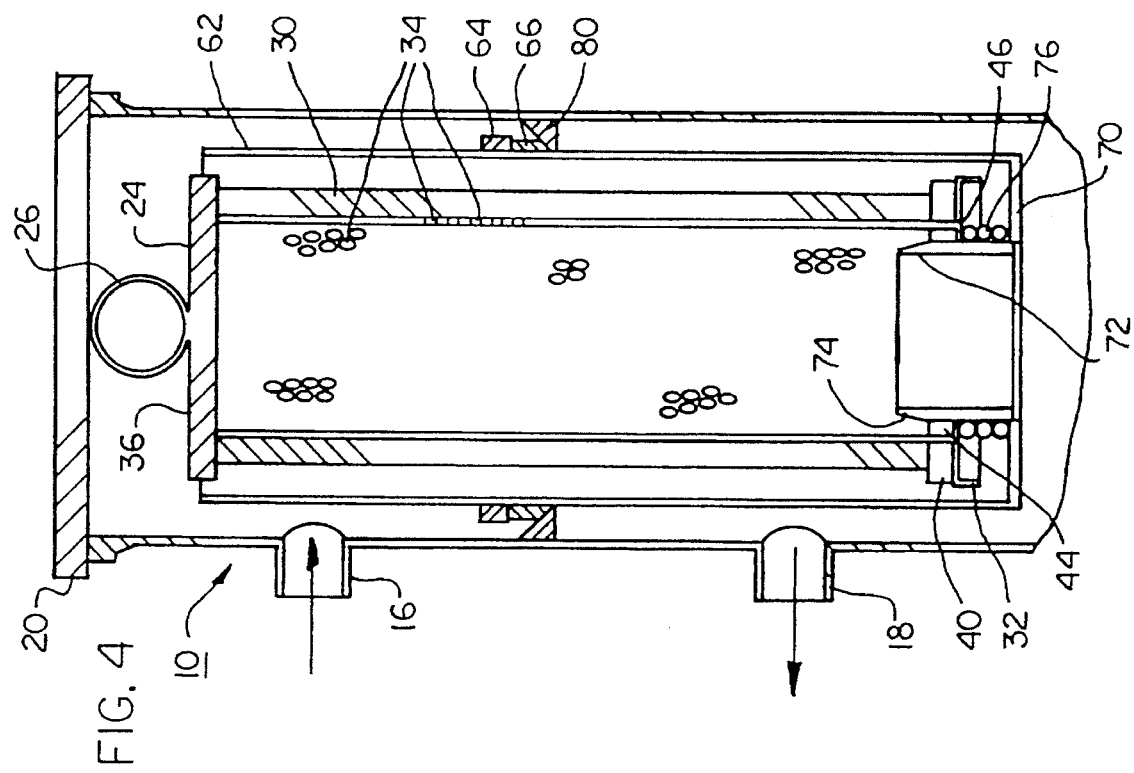
FIG. 4 is a cross-sectional view of the filter cartridge and filter adapter of the present invention installed in a conventional filter vessel.

Turning now to FIG. 4, there is shown a cross-sectional view of filter cartridge 22 and adapter 60 installed in a filter vessel 12. Unlike the prior art in which the cartridge must be sealed in the adapter end in which the adapter becomes an expended piece of hardware which must be replaced each time the filter is replaced, the present invention indirectly transmits the force necessary to properly form a seal between support ring 64 and the filter vessel's filter support shoulder 80 by transmitting this force through vessel top 20, perforated tubular inner support 34 and cartridge bottom 32 through biasing means 76, annular bottom plate 70 and tubular outer wall 62 to support ring 64. Since there is not a permanent bottom seal between filter cartridge 22 and filter adapter 60, filter cartridge 22 can be easily removed and disposed of without the necessity of also disposing of or handling filter adapter 60. As also can be seen, in the preferred embodiment, lifting ring 26 serves both the purpose of allowing the cartridge 22 to be easily removed as well as transmitting force from top 20 through cartridge top 24.

In operation, replaceable gasket 66 is placed on adapter 60 adjacent to the lower side of support ring 64. Filter adapter 60 is then placed into filter vessel 12 in a conventional manner. Filter cartridge 22 is then placed within filter adapter 60 and filter vessel top 20 is replaced and secured to the filter vessel. Securing filter vessel top 20 to filter vessel 12 causes filter cartridge 22 to compress spring 76 in filter adapter 60 while, at the same time, forming a seal between outlet seal 44 and inverted nozzle 72. At the same time, forces transmitted through adapter walls 62 and support ring 64 form a seal between filter support shoulder 80 and support ring 64 and gasket 66.

After the filter cartridge has reached its useful life, filter vessel top 20 is removed and filter cartridge 22 is removed by support ring 26 and disposed of by conventional means. At the same time, or as needed, replaceable gasket 66 may be replaced on filter adapter 60. A new filter cartridge 22 is then inserted into filter adapter 60 and filter vessel top 20 is resealed again.

In the present invention, the walls of the filter and filter adapter are preferably formed from stainless steel and silicone rubber is used for the gasket materials. However other materials could be used for specialized applications including glass and plastics for low temperature applications.

The present invention is also useful as a method for disposing of a filter containing hazardous particulate matter. After its useful life, the cartridge may be removed and discarded. For example, the cartridge, once it is removed from the adapter, may be compacted or shredded. Alternatively, the cartridge may be shredded followed by compacting the shredded cartridge.

Certain modifications and improvements will occur to those skilled in the art upon a reading of the foregoing description. By way of example, in a similar embodiment, the stainless steel supporting structure is on the outside of the replaceable filter cartridge to adapt the assembly for use in filter vessels piped for flows where the liquid passes from the inside to the outside of the filter. It should be understood that all such modifications and improvements have been deleted herein for the sake of conciseness and readability but are properly within the scope of the following claims.

We claim:

1. A filter assembly configured and arranged for removing particulate matter from an aqueous flow by means of a filter vessel having (i) a support housing, (ii) a removable top for said housing, (iii) an input port located in said housing for the aqueous flow, (iv) an exit port located in said housing for the aqueous flow and (v) an internal seal located within said housing, said filter assembly comprising:

(a) a filter adapter sized and configured to be substantially entirely received within said housing and sealingly engage said internal seal located within said housing, said filter adapter having an annular bottom plate defining an adapter outlet; and (b) a filter cartridge sized and configured to be substantially entirely received within said filter adapter and to simultaneously engage said filter vessel top and sealingly engage said filter adapter outlet and having a filter medium that extends across a path from said input port to said exit port when received in said housing, whereby said filter adapter may be installed in said filter vessel for an extended period and repeatedly during the extended period, said filter cartridge may be installed within said filter adapter to seal said cartridge to said filter adapter and said filter adapter to said filter vessel, aqueous flow may be directed through said filter medium, and the cartridge may be removed and discarded.

2. The apparatus according to claim 1, further including a biasing means located between said filter cartridge and said filter adapter whereby securing said filter vessel top to said filter vessel housing causes said filter cartridge to simultaneously compress said biasing means against said filter adapter, form a seal with said filter adapter outlet, and form a seal between said filter adapter and said internal seal of said filter vessel housing.

3. The apparatus according to claim 2, wherein said biasing means is a coil spring.

4. The apparatus according to claim 1, wherein said housing has a cylindrical shape including two ends and a sidewall, with an input port located at one end of the cylindrical shape and an exit port located at the other end of the cylindrical shape.

5. The apparatus according to claim 1, wherein said housing is made of stainless steel.

6. The apparatus according to claim 1, wherein said filter adapter includes an inverted nozzle extending from said filter adapter outlet and sized to sealingly engage one end of said filter cartridge.

7. The apparatus according to claim 6, wherein said inverted nozzle includes a tapered nose located on the end of said nozzle opposite the end of said inverted nozzle attached to said bottom plate.

8. The apparatus according to claim 1, wherein said filter adapter includes a support ring extending along its periphery and adapted to sealingly engage said internal seal of said filter vessel housing.

9. The apparatus according to claim 8, further including a gasket located between said support ring and said internal seal of said filter vessel housing.

10. The apparatus according to claim 9, wherein said gasket is formed from silicon rubber.

11. A filter cartridge configured and arranged for removing particulate matter from an aqueous flow and for installation inside a filter vessel having (i) a support housing, (ii) a removable top for said housing, (iii) an input port located in said housing for the aqueous flow, (iv) an exit port located in said housing for the aqueous flow and (v) an internal seal located within said housing; and a filter adapter sized and configured to be substantially entirely received within said housing and sealingly engage said internal seal located within said housing, said filter adapter having an annular bottom plate defining an adapter outlet, said filter cartridge comprising:

(a) a rigid, porous, sleeve having first and second ends, said first end having a closed end;

(b) a flexible filtering medium affixed to said sleeve;

(c) a first seal on said first end of the sleeve between said first end and said filtering media; and (d) a second seal on said second end of said sleeve between said second end and said filtering media, said sleeve and filtering medium sized and configured to be substantially entirely received within said filter adapter and to sealingly engage said filter adapter with said second seal and said filter medium extends across a path from the input port to the exit port of the housing, whereby said filter adapter may be installed in said filter vessel for an extended period and repeatedly during the extended period, said filter cartridge may be installed within said filter adapter to seal said filter cartridge to said filter adapter and said filter adapter to said filter vessel, aqueous flow may be directed through said filter medium, and the cartridge may be removed and discarded.

12. The apparatus according to claim 11, wherein said sleeve is polypropylene and said flexible filtering medium is selected from the group consisting of polysulfone and polypropylene.

13. The apparatus according to claim 12, wherein, said filtering medium filters particles between about 0.2 and 100 microns.

14. The apparatus according to claim 11, wherein, said seals are silicone rubber.

15. The apparatus according to claim 11, further including a lifting ring embedded in said first end of said sleeve.

16. The apparatus according to claim 11, wherein said sleeve is cylindrical.

17. The apparatus according to claim 11, wherein said filter medium is annularly disposed outside said sleeve.

18. A filter assembly configured and arranged for removing particulate matter from an aqueous flow by means of a filter vessel having (i) a support housing, (ii) a removable top for said housing, (iii) an input port located in said housing for the aqueous flow, (iv) an exit port located in said housing for the aqueous flow and (v) an internal seal located within said housing, said filter assembly comprising:

(a) a filter adapter sized and configured to be substantially entirely received within said housing and sealingly engage said internal seal located within said housing, said filter adapter having an annular bottom plate defining an adapter outlet;

(b) a filter cartridge sized and configured to be substantially entirely received within said filter adapter and to simultaneously engage said filter vessel top and sealingly engage said filter adapter outlet and having a filter medium that extends across a path from said input port to said exit port when received in said housing, said filter cartridge including: (i) a rigid, porous, sleeve having first and second ends, said first end having a closed end; (ii) a flexible filtering medium affixed to said sleeve; (iii) a first seal on said first end of the sleeve between said first end and said filtering media; and (iv) a second seal on said second end of said sleeve between said second end and said filtering media; and (c) further including a biasing means located between said filter cartridge and said filter adapter whereby securing said filter vessel top to said filter vessel housing causes said filter cartridge to simultaneously compress said biasing means against said filter adapter, form a seal with said filter adapter outlet, and form a seal between said filter adapter and said internal seal of said filter vessel housing, whereby said filter adapter may be installed in said filter vessel for an extended period and repeatedly during the extended period, said filter cartridge may be installed within said filter adapter to seal said cartridge to said filter adapter and said filter adapter to said filter vessel, aqueous flow may be directed through said filter medium, and the cartridge may be removed and discarded.

19. The apparatus according to claim 18, wherein said biasing means is a coil spring.

20. The apparatus according to claim 18, wherein said housing has a cylindrical shape including two ends and a sidewall, with an input port located at one end of the cylindrical shape and an exit port located at the other end of the cylindrical shape.

21. The apparatus according to claim 18, wherein said housing is made of stainless steel.

22. The apparatus according to claim 18, wherein said filter adapter includes an inverted nozzle extending from said filter adapter outlet and sized to sealingly engage one end of said filter cartridge.

23. The apparatus according to claim 22, wherein said inverted nozzle includes a tapered nose located on the end of said nozzle opposite the end of said inverted nozzle attached to said bottom plate.

24. The apparatus according to claim 18, wherein said filter adapter includes a support ring extending along its periphery and adapted to sealingly engage said internal seal of said filter vessel housing.

25. The apparatus according to claim 24, further including a gasket located between said support ring and said internal seal of said filter vessel housing.

26. The apparatus according to claim 25, wherein said gasket is formed from silicon rubber.

27. The apparatus according to claim 18, wherein said sleeve is polypropylene and said flexible filtering medium is selected from the group consisting of polysulfone and polypropylene.

28. The apparatus according to claim 27, wherein, said filtering medium filters particles between about 0.2 and 100 microns.

29. The apparatus according to claim 18, wherein, said seals are silicone rubber.

30. The apparatus according to claim 18, further including a lifting ring embedded in said first end of said sleeve.

31. The apparatus according to claim 18, wherein said sleeve is cylindrical.

* * * * *